United States Patent
Patrick et al.

(10) Patent No.: US 8,942,695 B2
(45) Date of Patent: Jan. 27, 2015

(54) METHOD AND APPARATUS FOR REDUCING CALL SETUP DELAY BY ADJUSTING SIB7 AND SIB14 SCHEDULING FREQUENCY

(75) Inventors: Chan Chun Chung Patrick, Hong Kong (HK); Amer Catovic, San Diego, CA (US); Mohit Narang, Escondido, CA (US); Alvin Siu-Chung Ng, Hong Kong (HK)

(73) Assignee: Qualcomm Incorporated, San Diego, CA (US)

( * ) Notice: Subject to any disclaimer, the term of this patent is extended or adjusted under 35 U.S.C. 154(b) by 1465 days.

(21) Appl. No.: 12/021,975

(22) Filed: Jan. 29, 2008

(65) Prior Publication Data
US 2008/0182571 A1    Jul. 31, 2008

Related U.S. Application Data

(60) Provisional application No. 60/887,590, filed on Jan. 31, 2007.

(51) Int. Cl.
| | |
|---|---|
| H04W 24/00 | (2009.01) |
| H04W 72/00 | (2009.01) |
| H04B 7/00 | (2006.01) |
| H04L 12/26 | (2006.01) |
| H04W 4/00 | (2009.01) |
| H04W 76/02 | (2009.01) |
| H04W 48/12 | (2009.01) |
| H04W 68/02 | (2009.01) |

(52) U.S. Cl.
CPC .............. *H04W 76/02* (2013.01); *H04W 48/12* (2013.01); *H04W 68/02* (2013.01)
USPC ........ 455/423; 455/452.1; 455/515; 370/252; 370/329

(58) Field of Classification Search
USPC ........... 455/458, 418–420, 422.1–423, 426.1, 455/435.1–435.3, 450–452.1, 464, 515; 370/252, 329–330
See application file for complete search history.

(56) References Cited

U.S. PATENT DOCUMENTS

| | | | |
|---|---|---|---|
| 7,480,510 B1 * | 1/2009 | Woleben et al. .............. 455/453 |
| 2001/0002191 A1 | 5/2001 | Kim | |
| 2004/0228294 A1 | 11/2004 | Kim et al. | |
| 2004/0228313 A1 | 11/2004 | Cheng et al. | |

(Continued)

FOREIGN PATENT DOCUMENTS

| | | |
|---|---|---|
| CA | 2649569 A1 | 11/2007 |
| RU | 2197779 C2 | 1/2003 |

(Continued)

OTHER PUBLICATIONS

Written Opinion—PCT/US2008/052708, International Search Authority, European Patent Office, May 14, 2008.

(Continued)

*Primary Examiner* — Michael Mapa
(74) *Attorney, Agent, or Firm* — Abdollah Katbab (57) ABSTRACT

An apparatus and method for reducing call setup time of a wireless communication device including measuring paging intensity, and adjusting SIB7 or SIB14 repetition period based on the measured paging intensity to reduce call setup time. In one aspect, a paging intensity threshold is determined based on the measured paging intensity, and the paging intensity threshold is used to adjust the SIB7 or SIB14 repetition period.

35 Claims, 9 Drawing Sheets

(56) References Cited

U.S. PATENT DOCUMENTS

| | | |
|---|---|---|
| 2005/0010677 A1 | 1/2005 | Krissell |
| 2005/0043034 A1* | 2/2005 | Abdel-Ghaffar et al. ..... 455/453 |
| 2005/0181767 A1 | 8/2005 | Boland et al. |
| 2005/0250497 A1 | 11/2005 | Ghosh et al. |
| 2006/0034204 A1 | 2/2006 | Lee et al. |
| 2006/0281456 A1* | 12/2006 | Roberts et al. ................ 455/434 |
| 2007/0049344 A1 | 3/2007 | Van Der Velde et al. |
| 2008/0182577 A1 | 7/2008 | Ng et al. |
| 2008/0207228 A1 | 8/2008 | Catovic et al. |
| 2009/0253422 A1 | 10/2009 | Fischer |

FOREIGN PATENT DOCUMENTS

| | | |
|---|---|---|
| RU | 2199825 C2 | 2/2003 |
| WO | WO0070791 A1 | 11/2000 |
| WO | WO03096580 A2 | 11/2003 |
| WO | WO2004030319 A2 | 4/2004 |
| WO | 2005064824 | 7/2005 |
| WO | 2007127942 | 11/2007 |

OTHER PUBLICATIONS

International Search Report—PCT/US08/052708, International Search Authority—European Patent Office—May 14, 2008.

Ericsson: "R2-052389 Call setup reduction from idle, CELL/URA_PCH", 3GPP TSG-RAN WG2 #48BIS, pp. 1-14, Oct. 7, 2005, XP002483177, Cannes, France, XRP002483177 [retrieved Oct. 7, 2005], the whole document.

Kennedy K et al: "Performance evaluation of a hybrid radio resource allocation algorithm in a GSM/GPRS network", 19000101 Proceedings of PIMRC '99: International Symposium on Personal and Indoor Mobile Radio Communications, pp. 131-136, Sep. 12-15 Osaka, Japan.

Nokia: "R2-051916 Analyses of setup delays using CELL_FACH state", 3GPP TSG-RAN WG2 #48, pp. 1-8 [Online] Aug. 24, 2005, XP002483178. London, UK, Retrieved from the Internet: URL:http://www.3gpp.org/ftp/tsg_ran/WG2_RL2/TSGR2_48/Documents/>, [retrieved on Jun. 5, 2008], the whole document.

Siemens: "R2-052831 on Improved Reception of SIB", 3GPP TSG RAN2#49, pp. 1-3, Nov. 2, 2005, XP002483402, Korea, Seoul.

Wieselthier J E et al: "Fixed-and Movable-Boundary Channel-Access Schemes for Integrated Voice-Data Wireless Networks", IEEE Transactions on Communications, IEEE Service Center, Piscataway, NJ, US, vol. 43. No. 1., Jan. 1, 1995, pp. 64-74.

"3GPP TR 25.815 v7.0.0 Signalling enhancements for Circuit-Switdhed (CS) and Packet-Swittched (PS) Connections; Analyses and recommendations", 3GPP TSG RAN Technical Report, Sep. 1, 2006 XP002483176, [retrieved Sep. 1, 2006] Sections 4,6, and 7.4.

"Universal Mobile Telecommunications System (UMTS); Radio Resource Control (RRC); Protocol specification (3GPP TS 25.331 version 7.2.0 Release 7); ETSI TS 125 331" Sep. 2006, ETSI Standards, European Telecommunications Standards Institute, pp. 44-50.

Taiwan Search Report—TW097103870—TIPO—Aug. 27, 2011.

Taiwan Search Report—TW097103862—TIPO—Jun. 27, 2011.

Universal Mobile Telecommunications System (UMTS); Radio Resource Control (RRC) protocol specification (3GPP TS 25.331 version 6.9.0 Release 6); ETSI TS 125 331 ETSI Standards, European Telecommunications Standards Institute, Sophia-Antipo, FR, vol. 3-R2, No. V690, Mar. 2006, XP014034301.

* cited by examiner

METHOD AND APPARATUS FOR REDUCING CALL SETUP DELAY BY ADJUSTING SIB7 AND SIB14 SCHEDULING FREQUENCY

CLAIM OF PRIORITY UNDER 35 U.S.C. §119

The present Application for Patent claims priority to Provisional Application No. 60/887,590 entitled "METHODS AND APPARATUS FOR REDUCING MOBILE TERMINATED CALL SETUP DELAY BY ADJUSTING SIB7 SCHEDULING" filed Jan. 31, 2007, and assigned to the assignee hereof and hereby expressly incorporated by reference herein.

REFERENCE TO CO-PENDING APPLICATIONS FOR PATENT

The present Application for Patent is related to the following co-pending U.S. Patent Applications:

"Method and Apparatus For Reducing Call Setup Delay by Including Interference Information In Paging Message" Amer Catovic, Alvin Siu-Chung Ng, Mohit Narang and Chan Chun Chung Patrick having Ser. No. 12/021,997, filed concurrently herewith, assigned to the assignee hereof, and expressly incorporated by reference herein; and "Method and Apparatus For Reducing Call Setup Delay by Improved SIB7 and SIB14 Scheduling" by Alvin Siu-Chung Ng; Amer Catovic; Mohit Narang and Chan Chun Chung Patrick having Ser. No. 12/021,985, filed concurrently herewith, assigned to the assignee hereof, and expressly incorporated by reference herein.

FIELD

This disclosure relates generally to apparatus and methods for reducing call setup time. More particularly, the disclosure relates to reducing call setup time by adjusting SIB7 scheduling frequency.

BACKGROUND

Mobile terminated (MT) call setup time is a key performance indicator in wireless networks. It has a direct effect on the user's experience regardless of any service offered by the network. Mobile terminated call setup time has a substantial impact on the overall revenue generated by the network as well as the churn rate. In cellular wireless networks, when the user equipment (UE) is idle, it wakes up at regular time intervals in order to check paging and read system information broadcast by the network. Current formats of wireless communication systems include the third generation (3G) systems which provide greater capacity and more broadband wireless capabilities than the previous 2G systems. The 3G systems include a Common Control Channel that broadcast system information from the wireless network to the UEs. One emerging 3G system is Universal Mobile Telecommunications Systems (UMTS). In UMTS, there are several Common Control Channels. For example, there are different information blocks on the Primary Common Control Physical Channel (P-CCPCH) in UMTS, categorized into Master Information Blocks (MIBs) and System Information Blocks (SIBs).

For example, each SIB carries a particular type of network information, such as but not limited to, Public Land Mobile Network (PLMN) info, DRX cycle coefficient (SIB1), thresholds for cell reselection (SIB3), current uplink interference level (SIB7), paging frequency, timers, etc. The broadcast scheduling of these system information blocks is contained in the master information block (MIB) which is broadcasted in regular, pre-determined time intervals. MIB contains the exact repetition count, number of segments and system frame number for each of the SIBs broadcasted. One of the SIBs is SIB7 which carries the up-to-date uplink interference level perceived by the base station receiver. Each UE needs to read SIB7 of the camping cell before establishing a connection with the network. The SIB7 information contains the uplink interference level which is used in the open loop power control calculation to determine the appropriate transmit power level for random access. Additionally, the UE decodes its paging block in order to determine if the UE is being paged by the network. In some instances, reading the SIB7 and being paged by the network can occur simultaneously or near simultaneously.

The paging block is broadcast through the Secondary Common Control Physical Channel (S-CCPCH). Typically, the decoding of the paging block (on S-CCPCH) has higher priority over the decoding of SIBs (on P-CCPCH). When the UE is being paged, it cannot immediately initiate a connection with the network to respond to the page until the UE has received the next occurrence of broadcasted SIB7. As a result, there is a necessary waiting time between the receipt of the page and connection request initiation with the network. The waiting time can vary among different UEs, some waiting time being longer than desirable to ensure good user experience.

SUMMARY

Disclosed is an apparatus and method for reducing mobile terminated (MT) call setup time. By adjusting the SIB7 or SIB14 scheduling frequency as disclosed herein, advantageous results may include reducing the average MT call setup time, reducing the average waiting time for the next occurrence of SIB7 or SIB14, increase call success rate performance, and hence, ensuring better user experience. Additionally, bandwidth efficiency is increased since previously unused bandwidth on the P-CCPCH channel may be used. Thus, by adjusting the SIB7 or SIB14 scheduling frequency as disclosed herein, the impact of high paging-to-SIB7 or SIB14 delay when there are more paged users is reduced. Also, in the case of reduced number of paged users, the SIB7 or SIB14 scheduling frequency can be adjusted lower to minimize overheads and downlink interference associated with the transmission of additional SIB7 or SIB14 blocks.

According to one aspect, a method for reducing call setup time of a wireless communication device comprises measuring paging intensity, and adjusting SIB7 or SIB14 repetition period based on the measured paging intensity to reduce call setup time.

According to another aspect, a method for reducing call setup time of a wireless communication device comprises measuring paging intensity, determining a paging intensity threshold based on the measured paging intensity, updating SIB7 or SIB14 repetition period based on the paging intensity threshold to reduce call setup time, and transmitting at least one SIB7 or SIB14 block based on the updated SIB7 or SIB14 repetition period.

According to another aspect, an apparatus comprises a processor and a memory, the memory containing program code executable by the processor for performing the following: measuring paging intensity, and adjusting SIB7 or SIB14 repetition period based on the measured paging intensity to reduce call setup time.

According to another aspect, an apparatus comprises a processor and a memory, the memory containing program code executable by the processor for performing the following: measuring paging intensity, determining a paging intensity threshold based on the measured paging intensity, updating SIB7 or SIB14 repetition period based on the paging intensity threshold to reduce call setup time, and transmitting at least one SIB7 or SIB14 block based on the updated SIB7 or SIB14 repetition period.

According to another aspect, an apparatus for reducing call setup time comprises means for measuring paging intensity, and means for adjusting SIB7 or SIB14 repetition period based on the measured paging intensity to reduce call setup time.

According to another aspect, an apparatus for reducing call setup time comprises means for measuring paging intensity, means for determining a paging intensity threshold based on the measured paging intensity, means for updating SIB7 or SIB14 repetition period based on the paging intensity threshold to reduce call setup time, and means for transmitting at least one SIB7 or SIB14 block based on the updated SIB7 or SIB14 repetition period.

According to another aspect, a computer-readable medium including program code stored thereon, which when executed by at least one computer implement a method, comprises program code for measuring paging intensity, and program code for adjusting SIB7 or SIB14 repetition period based on the measured paging intensity to reduce call setup time.

According to another aspect, a computer-readable medium including program code stored thereon, comprises program code for causing a computer to measure paging intensity, program code for causing the computer to determine a paging intensity threshold based on the measured paging intensity, program code for causing the computer to update SIB7 or SIB14 repetition period based on the paging intensity threshold to reduce call setup time, and program code for causing the computer to transmit at least one SIB7 or SIB14 block based on the updated SIB7 or SIB14 repetition period.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Scheduling and the repetition time of SIB7 broadcasts are constant and set by the network. Paging occasions are also determined based on the International Subscriber Mobile Identity (IMSI) of the UE. As a result of these standards, the waiting time between the receipt of a page and connection request initiation with the network for the UE will depend on the paging groups to which the UE belongs. For example, if the UE belongs to the paging group that is adjacent to the next SIB7 scheduling slot, the UE will experience the smallest waiting time. In contrast, if the UE belongs to the paging group that overlaps between the paging blocks and SIB7, the decoding of the paging has higher priority (by convention), and the UE will miss the decoding of the SIBs. In such a case, the UE will experience the largest waiting time and experience consistently the largest MT call setup times.

Figure 1:
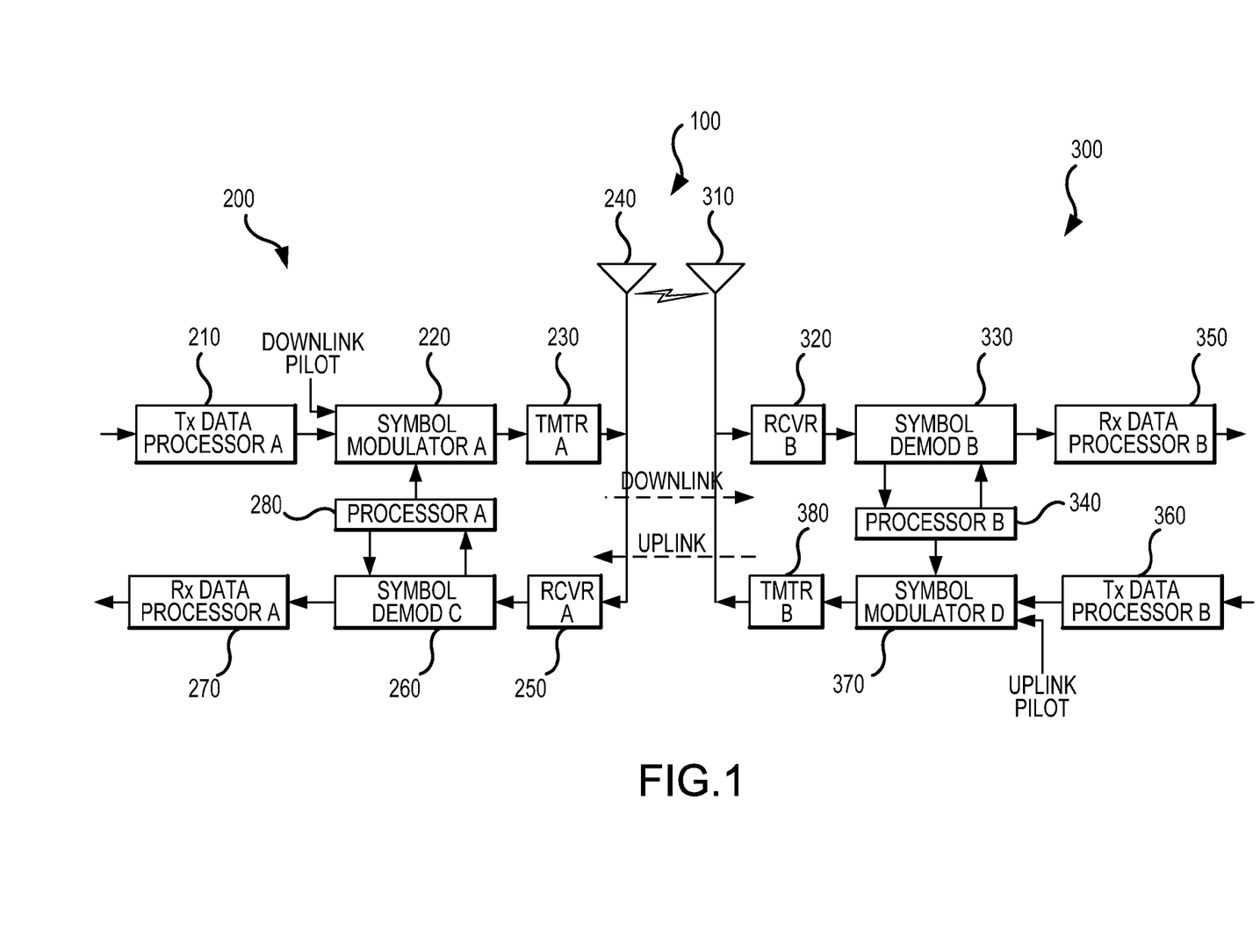
FIG. 1 is a block diagram illustrating an exemplary wireless network.

FIG. 1 is a block diagram illustrating an exemplary wireless network 100. One skilled in the art would understand that the exemplary wireless network 100 illustrated in FIG. 1 may be implemented in an FDMA environment, an OFDMA environment, a CDMA environment, a WCDMA environment, a TDMA environment, a SDMA environment or any other suitable wireless environment.

The wireless network 100 includes an access point 200 (a.k.a. base station) and a wireless communication device 300 (a.k.a. user equipment or UE). In the downlink leg, the access point 200 (a.k.a. base station) includes a transmit (TX) data processor A 210 that receives, formats, codes, interleaves and modulates (or symbol maps) traffic data and provides modulation symbols (a.k.a. data symbols). The TX data processor A 210 is in communication with a symbol modulator A 220. The symbol modulator A 220 receives and processes the data symbols and downlink pilot symbols and provides a stream of symbols. In one aspect, symbol modulator A 220 is in communication with processor A 280 which provides configuration information. Symbol modulator A 220 is in communication with a transmitter unit (TMTR) A 230. The symbol modulator A 220 multiplexes the data symbols and downlink pilot symbols and provides them to the transmitter unit A 230.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 230 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 240.

In the downlink leg, the wireless communication device 300 (a.k.a. UE) includes antenna 310 for receiving the analog downlink signal and inputting the analog downlink signal to a receiver unit (RCVR) B 320. In one aspect, the receiver unit B 320 conditions, for example, filters, amplifies and frequency downconverts the analog downlink signal to a "conditioned" signal. The "conditioned" signal is then sampled. The receiver unit B 320 is in communication with a symbol demodulator B 330. The symbol demodulator B 330 demodulates the "conditioned" and "sampled" signal (a.k.a. data symbols) outputted from the receiver unit B 320. The symbol demodulator B 330 is in communication with a processor B 340. Processor B 340 receives downlink pilot symbols from symbol demodulator B 330 and performs channel estimation on the downlink pilot symbols. In one aspect, the channel estimation is the process of characterizing the current propagation environment. The symbol demodulator B 330 receives a frequency response estimate for the downlink leg from processor B 340. The symbol demodulator B 330 performs data demodulation on the data symbols to obtain data symbol estimates. The data symbol estimates are estimates of the data symbols that were transmitted. The symbol demodulator B 330 is also in communication with a RX data processor B 350. The RX data processor B 350 receives the data symbol estimates from the symbol demodulator B 330 and, for example, demodulates (i.e., symbol demaps), interleaves and/or decodes the data symbol estimates to recover the traffic data. In one aspect, the processing by the symbol demodulator B 330 and the RX data processor B 350 is complementary to the processing by the symbol modulator A 220 and TX data processor A 210, respectively.

In the uplink leg, the wireless communication device 300 (a.k.a. UE) includes a TX data processor B 360. The TX data processor B 360 receives and processes traffic data to output data symbols. The TX data processor B 360 is in communication with a symbol modulator D 370. The symbol modulator D 370 receives and multiplexes the data symbols with uplink pilot symbols, performs modulation and provides a stream of symbols. In one aspect, symbol modulator D 370 is in communication with processor B 340 which provides configuration information. The symbol modulator D 370 is in communication with a transmitter unit B 380.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 380 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 310.

The analog uplink signal from wireless communication device (UE) 300 is received by antenna 240 and processed by a receiver unit A 250 to obtain samples. In one aspect, the receiver unit A 250 conditions, for example, filters, amplifies and frequency downconverts the analog uplink signal to a "conditioned" signal. The "conditioned" signal is then sampled. The receiver unit A 250 is in communication with a symbol demodulator C 260. The symbol demodulator C 260 performs data demodulation on the data symbols to obtain data symbol estimates and then provides the uplink pilot symbols and the data symbol estimates to the RX data processor A 270. The data symbol estimates are estimates of the data symbols that were transmitted. The RX data processor A 270 processes the data symbol estimates to recover the traffic data transmitted by the wireless communication device 300. The symbol demodulator C 260 is also in communication with processor A 280. Processor A 280 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 280 and processor B 340 direct (i.e., control, coordinate or manage, etc.) operation at the access point 200 (a.k.a. base station) and at the wireless communication device 300 (a.k.a. user equipment or UE), respectively. In one aspect, either or both processor A 280 and processor B 340 are associated with one or more memory units (not shown) for storing of program codes and/or data. In one aspect, either or both processor A 280 or processor B 340 or both perform computations to derive frequency and impulse response estimates for the uplink leg and downlink leg, respectively.

In one aspect, the wireless network 100 is a multiple-access system. For a multiple-access system (e.g., FDMA, OFDMA, CDMA, TDMA, etc.), multiple terminals transmit concurrently on the uplink leg. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

One skilled in the art would understand that the techniques described herein may be implemented by various ways. For example, the techniques may be implemented in hardware, software or a combination thereof. For example, for a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that performs the functions described therein. The software codes may be stored in memory units and executed by processor A 280 and processor B 340.

The various illustrative logical blocks, modules, and/or circuits described herein may be implemented or performed with one or more processor units (a.k.a. processor). A processor may be a general purpose processor, such as a microprocessor, a specific application processor, such a digital signal processor (DSP), or any other hardware platform capable of supporting software. Software shall be construed broadly to mean any combination of instructions, data structures, or program code, whether referred to as software, firmware, middleware, microcode, or any other terminology. Alternatively, a processor may be an application specific integrated circuit (ASIC), a programmable logic device (PLD), a field programmable gate array (FPGA), a controller, a micro-controller, a state machine, a combination of discrete hardware components, or any combination thereof. The various illustrative logical blocks, modules, and/or circuits described herein may also include computer readable medium for storing software. The computer readable medium may also include one or more storage devices, a transmission line, or a carrier wave that encodes a data signal.

Figure 2A:
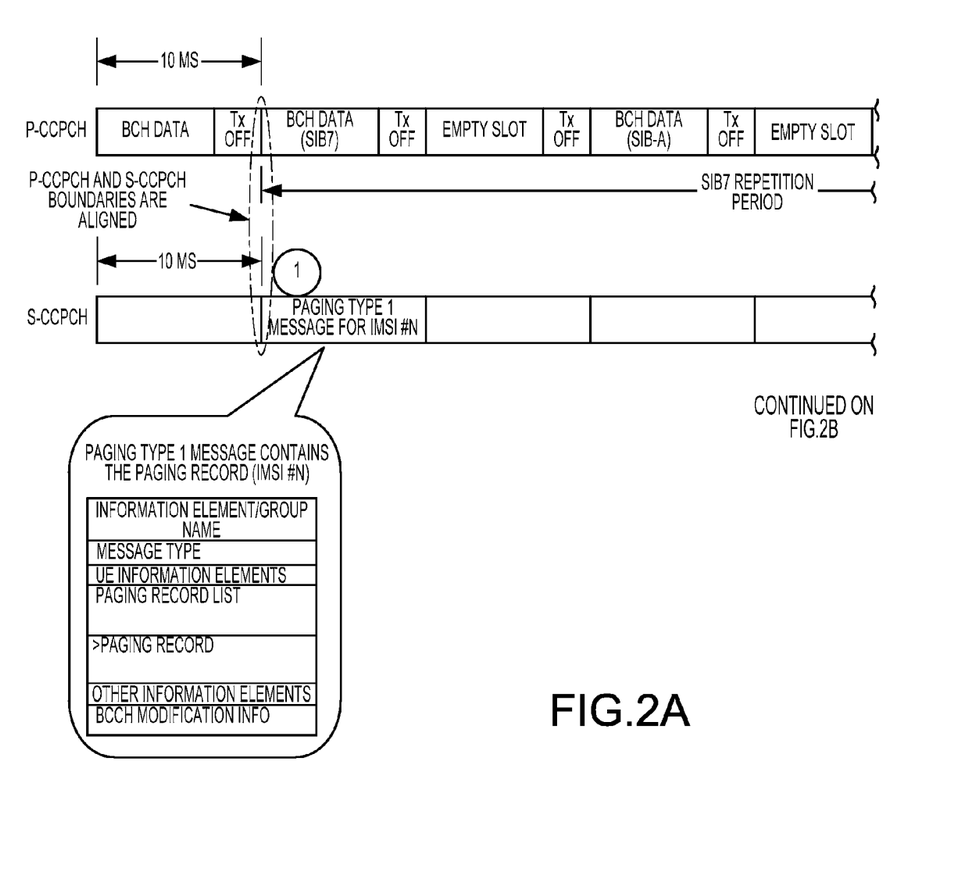
FIGS. 2a and 2b illustrate the timeline overlap of paging blocks and SIB broadcast blocks.
Figure 2B:
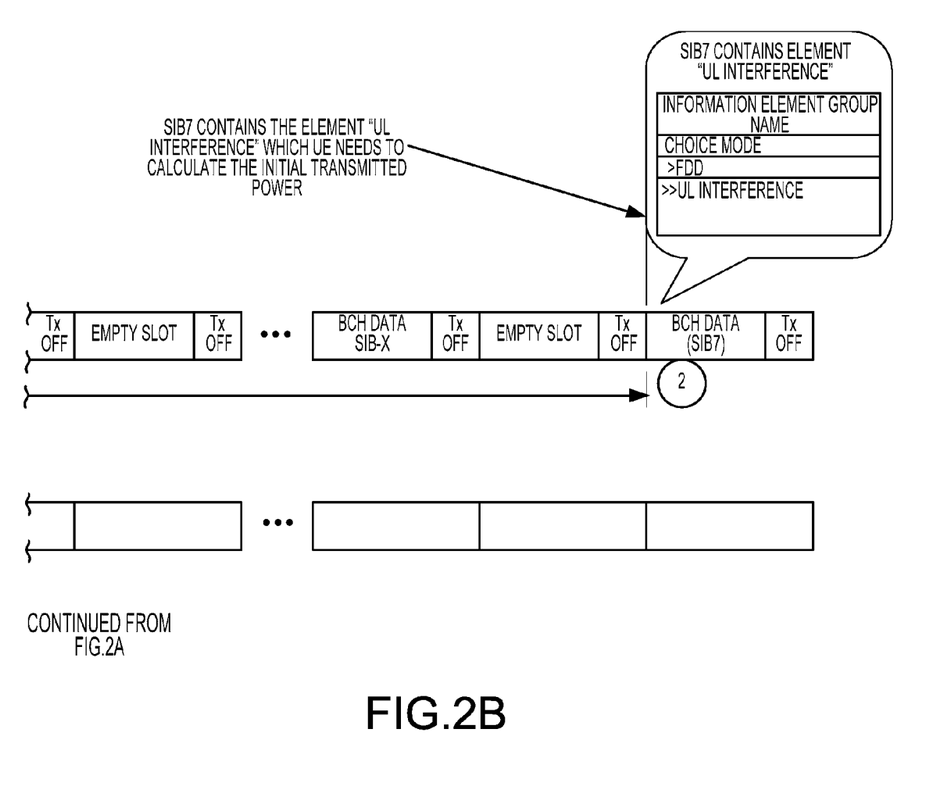

FIGS. 2a and 2b illustrate the timeline overlap of paging blocks and SIB broadcast blocks. When the wireless network 100 pages the wireless communication device 300 (a.k.a. UE), it sets the paging indicator (PI) corresponding to the wireless communication device 300 (a.k.a. UE) on the paging indicator channel (PICH). In one aspect, one or more wireless communication devices can be assigned to the same PI. Each wireless communication device monitors only specific frames (a.k.a. paging occasions) on the PICH in order to determine the value of its PI. In one aspect, the system frame number (SFN) of the paging occasion for each wireless communication device is calculated as:

$$SFN=\{(IMSI\ div\ K)\bmod DRX\ cycle\ length\}+n*DRX\ cycle\ length+frame\ offset \qquad (1)$$

where K is the number of S-CCPCH channels in a cell; DRX cycle length is a configurable parameter set by the wireless network; IMSI is the International Mobile Subscriber Identity which is a fixed number assigned by the wireless network to each subscriber and n=0, 1, 2 . . . as long as SFN is less than maximum (<256). In one example, K is set to 1.

If the wireless communication device 300 (a.k.a. UE) determines that its PI on the PICH is set, the wireless communication device 300 (a.k.a. UE) will read the paging channel (PCH) to determine if the incoming page is destined for itself. PCH is mapped onto a Common Control Channel. In one aspect, the Common Control Channel is the Secondary Common Control Physical Channel (S-CCPCH) in UMTS. In some instances, the transmission of the paging block overlaps with the broadcast of SIBs that the wireless communication device 300 (a.k.a. UE) needs to read for starting random access. The paging block that is broadcasted through the Secondary Common Control Physical Channel (S-CCPCH) typically has higher priority over the decoding of SIBs (on P-CCPCH). Hence, the wireless communication device 300 (a.k.a. UE) will read the paging block and miss the SIBs. In particular, if the paging block overlaps with SIB7, the wireless communication device 300 (a.k.a. UE) will miss decoding the SIB7. When the wireless communication device 300 (a.k.a. UE) is being paged, it cannot immediately initiate a connection with the wireless network to respond to the page until it has received the next occurrence of broadcasted SIB7, resulting in a waiting time between the receipt of the page and connection request initiation with the wireless network 100. The SIB7 information contains the uplink interference level which is used in the open loop power control calculation to determine the appropriate transmit power level for random access.

As shown in FIGS. 2a and 2b, item 1 is the paging type 1 message intended for IMSI #N. Item 2 is the BCH data containing the SIB7 intended for the wireless communication device 300 (a.k.a. UE) with IMSI #N. The wireless communication device 300 (a.k.a. UE) has to decode SIB7 before it can respond to the page. In this example, however, since the paging block overlaps the SIB7, the wireless communication device 300 (a.k.a. UE) would need to wait for the next occurrence of SIB7. Thus, in this example, the wireless communication device 300 (a.k.a. UE) will have the worst MT call setup time.

Figure 3:
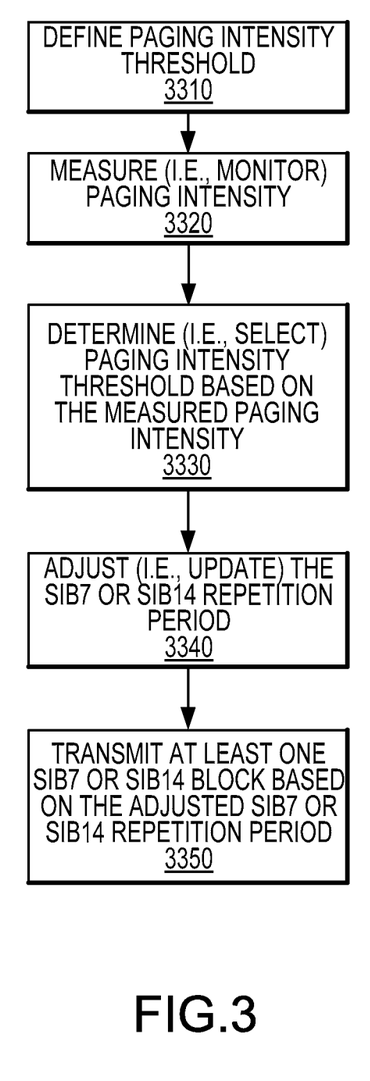
FIG. 3 is an exemplary flow diagram for adjusting SIB7 (or SIB14) repetitions based on the wireless network paging intensity.

FIG. 3 is an exemplary flow diagram for adjusting SIB7 (or SIB14) repetitions based on the wireless network paging intensity. Paging intensity is a measure of incoming paging activity such as the number of paged users in the controlled coverage area within a certain time period. In one aspect, a mathematical function or time filtering of paging activity may be used to define paging intensity. One skilled in the art would understand that the definition of paging intensity may be based on system parameters, network parameters, design parameters or operator choice, etc., without affecting the scope and spirit of the disclosure.

In one aspect, once the process described in FIG. 3 is started, paging intensity is continuously monitored by the wireless network 100 until the process is stopped. In block 3310, the paging intensity threshold is defined. In one aspect, the paging intensity thresholds are predefined by the wireless network 100. One skilled in the art would understand that the value of the paging intensity thresholds may be based on system parameters, network parameters, design parameters, operator choice or user choice, etc., without affecting the scope and spirit of the disclosure. In one aspect, the paging intensity thresholds are stored in one or more look-up table lists. In one aspect, once defined, the paging intensity thresholds are fixed. In another aspect, the paging intensity thresholds may be variable and will vary according to parameters set by the network, operator or other conditions. For example, a set of paging intensity thresholds is predefined to correspond to a set of paging intensities. Here, each of the paging intensity thresholds in the set is matched to each of the paging intensities.

Once the paging intensity thresholds are defined, in block 3320, the wireless network 100 measures (i.e., monitors) the paging intensity. In one aspect, the Radio Network Controller (RNC) in the wireless network 100 processes the measuring of the paging intensity. In block 3330, determine (i.e., select) the paging intensity threshold based on the measured paging intensity. In block 3340, the SIB7 (or SIB14) repetition period is adjusted. In one aspect, the adjustment includes the following: 1) depending on the measured paging intensity, the wireless network 100 determines the paging intensity threshold based on the measured paging intensity, and 2) the corresponding SIB7 (or SIB14) repetition period is updated (i.e., adjusted) according to the paging intensity threshold. Typically, all RNCs are configured with some wireless network configured SIB7 repetition period X. In one aspect, each RNC will employ a different SIB7 repetition period Y such that Y is derived from X and some mathematical function regarding paging intensity known to those skilled in the art. In one aspect, the RNC increases the SIB7 repetitions (i.e., reduces the SIB7 repetition period) if the paging intensity is high. For example, the SIB7 repetition period Y is reduced by half to Y/2 if a particular paging intensity threshold is reached or surpassed. In one aspect, multiple paging intensity thresholds are configured to further decrease the SIB7 repetition period. In one aspect, the RNC decreases the SIB7 repetitions (i.e., increase the SIB7 repetition period) if the paging intensity is low. For example, the SIB7 repetition period Y is doubled to 2Y if the measured paging intensity is lower than a particular paging intensity threshold. In one aspect, the SIB7 repetition period never exceeds a wireless network configured SIB7 repetition period, for example, chosen by the network operator. In one aspect, the minimum SIB7 repetition period from the existing 3gpp standard is set as the lower limit of the SIB7 repetition period Y. In another aspect, if the lower limit of the SIB7 repetition period Y is set below the repetition period from the existing 3gpp standard, one skilled in the art may determine the appropriate software changes for the wireless communication device 300 and/or other components in the wireless network 100. One skilled in the art would understand that additional signaling may be needed between the upper layers (e.g., other software in the wireless network 100) and the RNC for adjusting SIB7 repetition periods. In one aspect, hysteresis and expiration timer are used in conjunction with the paging intensity thresholds. For example, the paging intensity must surpass the sum of a particular paging intensity threshold and a hysteresis value for a duration T as measured by the expiration timer before the SIB7 repetition period is adjusted. In block 3350, at least one SIB7 (or SIB14) block is transmitted based on the adjusted SIB7 (or SIB14) repetition period. One skilled in the art would understand that the duration T may be chosen based on system or application parameters, design or operator choices without affecting the scope or spirit of the disclosure.

One skilled in the art would understand that in one aspect, the processes described in FIG. 3 relates to Frequency Division Duplex (FDD) mode in which the uplink interference level is contained in SIB7 blocks. Additionally, one skilled in the art would understand that in Time Division Duplex (TDD) mode, uplink interference level is contained in SIB14 blocks and that the processes in FIG. 3 referencing SIB7 blocks could be substituted with SIB14 blocks without affecting the scope or spirit of the processes.

In one aspect, an update time $T_{update}$ is pre-defined such that the processes in blocks 3320, 3330 and 3340 are repeated after waiting $T_{update}$ and this loop cycle continues until the process in FIG. 3 is stopped. In one example, before proceeding with each loop cycle, confirmation that the process in FIG. 3 is still enabled. In one aspect, the $T_{update}$ is a fixed value and in another aspect, the $T_{update}$ is a variable value. One skilled in the art would understand that the value of $T_{update}$ may be based on system parameters, design parameters, operator choice or user choice, etc., without affecting the scope and spirit of the disclosure.

In one aspect, in frequency division duplex (FDD), the UTRAN (UMTS Terrestrial Radio Access Network) will adjust the SIB7 repetition period and reschedule the SIB7 blocks according to the new SIB7 repetition period. For example, after receiving a SIB7 block in a position different than the originally scheduled position, the wireless communication device 300 continues to process (i.e., decode) the SIB7 blocks. In another example, after receiving a SIB7 block even if the new scheduled position is not available or not yet received, the wireless communication device 300 continues to process the SIB7 blocks. In one aspect, the wireless network 100 continuously monitors the Common Control Channel for scheduling information in the MIBs, and thus in this example, the wireless network 100 does not need to reflect the change of the SIB7 repetition period in the MIBs. In one aspect, the processing may include storing the content of the SIB7 block, starting an expiration timer with a predefined value and considering the content valid until the expiration timer expires. In one aspect, the expiration timer is fixed. In one example, the expiration time factor of the expiration timer is set to be inversely proportional to the SIB7 repetition period. In another aspect, the expiration timer is variable. One skilled in the art would understand that the predefined value may be based on system parameters or operator choice, etc., without affecting the scope and spirit of the disclosure.

In one aspect, the SIB7 repetition period is variable and adjustable. The scheduling information of the SIB7 block is transmitted in the MIBs. The value tag of the MIBs is changed to correspond to the change in the scheduling information of the SIB7 block as notification to the wireless communication device 300. Hence, the wireless communication device 300 is able to find the SIB7 blocks in the new scheduled positions.

Figure 4:
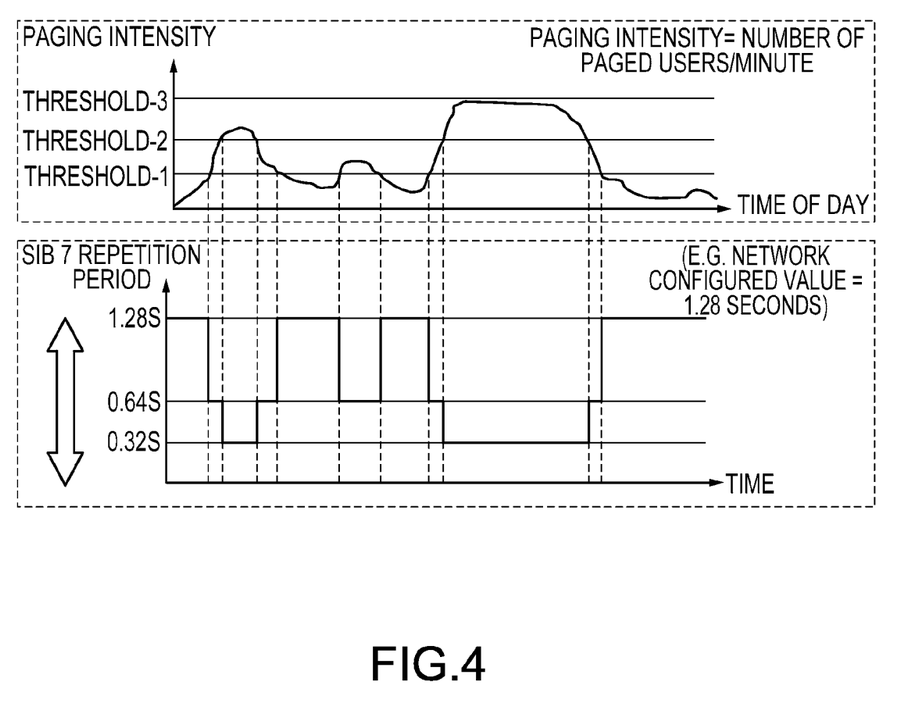
FIG. 4 is an example illustrating adjusting SIB7 repetitions based on paging intensity.

FIG. 4 is an example illustrating adjusting SIB7 repetitions based on paging intensity. In the example, three paging intensity thresholds are shown graphed against time of day. The SIB7 repetition period is also shown graphed against time of day. Three values of SIB7 repetition periods (1.28 seconds, 0.64 seconds and 0.32 seconds) are illustrated. In FIG. 4, working from left to right the repetition period is at 1.28 sec. until paging intensity threshold 1 is exceeded. The repetition period is then reduced to 0.64 sec. until paging intensity threshold 2 is exceeded when the repetition period is further reduced to 0.32 sec. Once, the paging intensity is below paging intensity threshold 2, the repetition period increases back to 0.64 sec. And, as the paging intensity decreases below paging intensity threshold 1, the repetition period increases back to 1.28 sec. The values of the repetition period for the remaining time of day are set according to the paging intensity thresholds reached as shown in FIG. 4. In the example shown in FIG. 4, the wireless network configured SIB7 repetition period is 1.28 sec.

One skilled in the art would understand that in one aspect, the disclosure relates to Frequency Division Duplex (FDD) mode in which the uplink interference level is contained in SIB7 blocks. Additionally, one skilled in the art would understand that in Time Division Duplex (TDD) mode, uplink interference level is contained in SIB14 blocks and that the disclosure herein referencing SIB7 blocks could be substituted with SIB14 blocks without affecting the scope or spirit of the disclosure.

Figure 5:
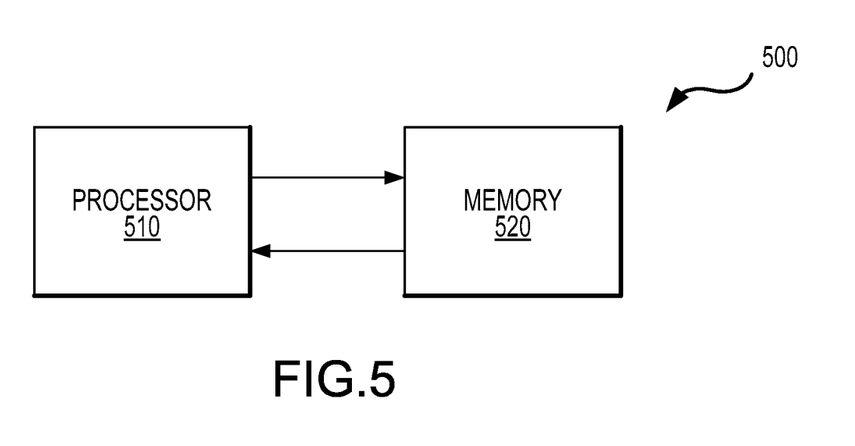
FIG. 5 illustrates an implementation for reducing call setup time.

FIG. 5 illustrates an implementation for reducing call setup time. In one example, the implementation of reducing call setup time is achieved through device 500 which comprises a processor 510 in communication with a memory 520 as shown in FIG. 5. In one aspect, the memory 520 is located within the processor 510. In another aspect, the memory 520 is external to the processor 510.

Figure 6:
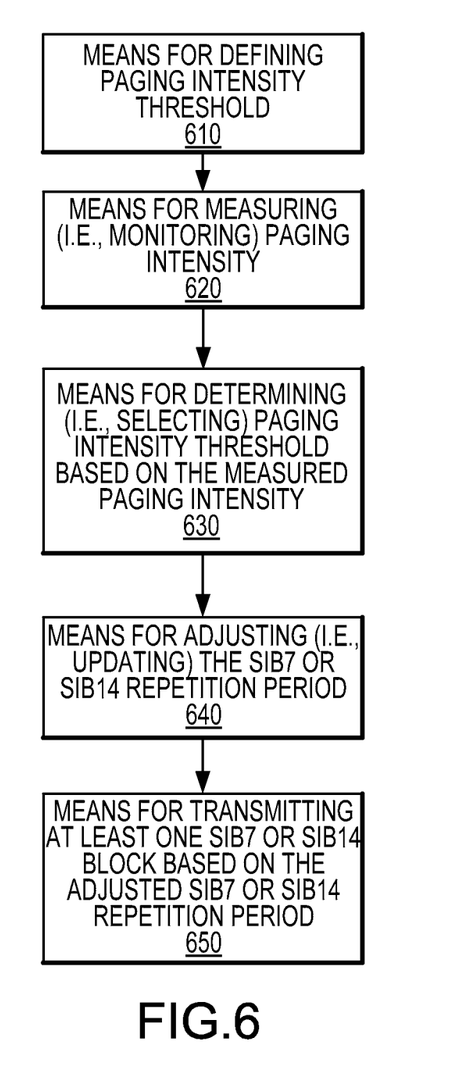
FIG. 6 illustrates a first embodiment of a device suitable for reducing call setup time.

FIG. 6 shows a first embodiment of a device 600 suitable for reducing call setup time. In one aspect, the device 600 is implemented by at least one processor comprising one or more modules configured to provide different aspects of reducing call setup time as described herein in blocks 610, 620, 630, 640 and 650. For example, each module comprises hardware, software, or any combination thereof. In one aspect, the device 600 is also implemented by at least one memory in communication with the at least one processor.

Figure 7:
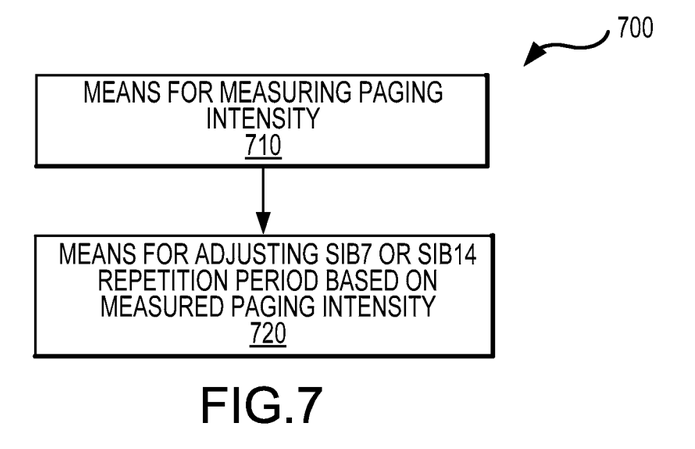
FIG. 7 illustrates a second embodiment of a device suitable for reducing call setup time.

FIG. 7 shows a second embodiment of a device 700 suitable for reducing call setup time. In one aspect, the device 700 is implemented by at least one processor comprising one or more modules configured to provide different aspects of reducing call setup time as described herein in blocks 710 and 720. For example, each module comprises hardware, software, or any combination thereof. In one aspect, the device 700 is also implemented by at least one memory in communication with the at least one processor.

Figure 8:
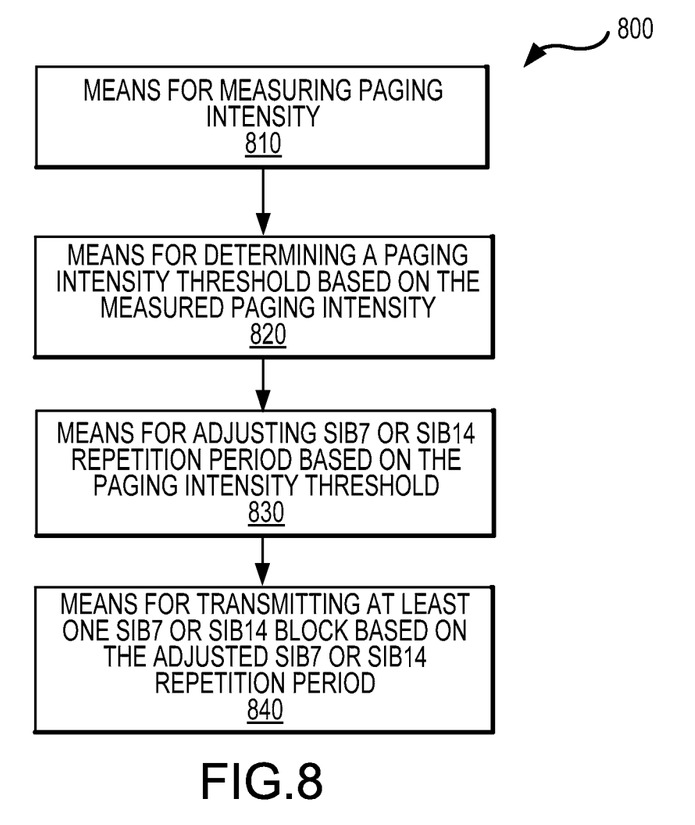
FIG. 8 illustrates a third embodiment of a device suitable for reducing call setup time.

FIG. 8 shows a third embodiment of a device 800 suitable for reducing call setup time. In one aspect, the device 800 is implemented by at least one processor comprising one or more modules configured to provide different aspects of reducing call setup time as described herein in blocks 810, 820, 830 and 840. For example, each module comprises hardware, software, or any combination thereof. In one aspect, the device 800 is also implemented by at least one memory in communication with the at least one processor.

Figure 9:
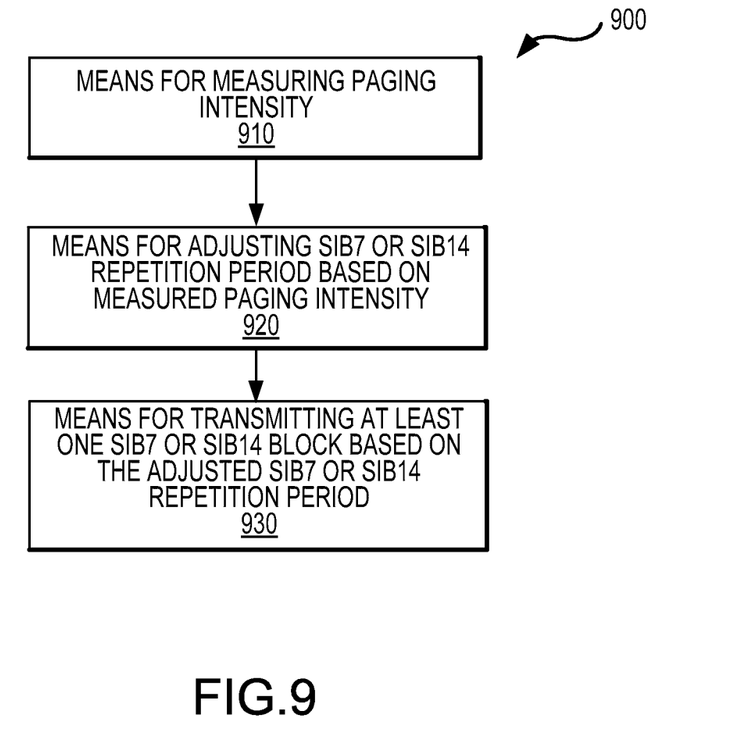
FIG. 9 illustrates a fourth embodiment of a device suitable for reducing call setup time.

FIG. 9 shows a fourth embodiment of a device 900 suitable for reducing call setup time. In one aspect, the device 900 is implemented by at least one processor comprising one or more modules configured to provide different aspects of reducing call setup time as described herein in blocks 910, 920 and 930. For example, each module comprises hardware, software, or any combination thereof. In one aspect, the device 900 is also implemented by at least one memory in communication with the at least one processor. In one aspect, at least one of the modules comprises means 930 for transmitting at least one SIB7 or SIB14 block wherein the means 930 comprises a transmitting antenna and/or a transmitter.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for reducing call setup time of a wireless communication device comprising:
    measuring paging intensity, the paging intensity based at least in part on a number of paged users within a coverage area of the wireless communication device over a time period; and
    adjusting an uplink interference system information block repetition period based on the measured paging intensity to reduce call setup time.

2. The method of claim 1 further comprising confirming that the process of claim 1 is enabled and repeating the process of claim 1 after waiting an update time.

3. The method of claim 1 further comprising transmitting at least one uplink interference system information block based on the adjusted uplink interference system information block repetition period.

4. The method of claim 1 wherein the uplink interference system information block repetition period is adjusted to not exceed a network configured uplink interference system information block repetition period.

5. The method of claim 1 wherein the uplink interference system information block repetition period is adjusted to not be below a predetermined value.

6. The method of claim 1 wherein the uplink interference system information block repetition period is adjusted to half its current value.

7. The method of claim 1 wherein the uplink interference system information block repetition period is adjusted to double its current value.

8. The method of claim 1 wherein the adjusting process comprises determining a paging intensity threshold based on the measured paging intensity, and updating the uplink interference system information block repetition period based on the paging intensity threshold.

9. The method of claim 8 wherein the paging intensity threshold includes a hysteresis value and wherein the paging intensity threshold is surpassed for a duration T as measured by an expiration timer.

10. The method of claim 8 further comprising defining a set of paging intensity thresholds corresponding to a set of paging intensities from which the paging intensity threshold is determined.

11. The method of claim 10 wherein the set of paging intensity thresholds is listed in a lookup table.

12. The method of claim 8 wherein the paging intensity threshold is listed in a lookup table.

13. The method of claim 1 wherein the wireless communication device is part of a 3G system.

14. The method of claim 13 wherein the wireless communication device is part of an universal mobile telecommunications system.

15. The method of claim 1 further comprising receiving a uplink interference system information block transmitted on the adjusted repetition period.

16. The method of claim 15 further comprising decoding the uplink interference system information block to obtain an uplink interference level.

17. The method of claim 16 wherein the decoding step includes storing the content of the uplink interference system information block, starting an expiration timer based at least in part on the measured paging intensity and considering the content of the uplink interference system information block valid until the expiration timer expires.

18. The method of claim 17 wherein the uplink interference level is used in an open loop power control calculation to determine an appropriate transmit power level for the wireless communication device.

19. The method of claim 16 wherein the uplink interference level is used in an open loop power control calculation to determine an appropriate transmit power level for the wireless communication device.

20. A method for reducing call setup time of a wireless communication device comprising:
    measuring paging intensity, the paging intensity based at least in part on a number of paged users within a coverage area of the wireless communication device over a time period;
    determining a paging intensity threshold based on the measured paging intensity;
    updating an uplink interference system information block repetition period based on the paging intensity threshold to reduce call setup time; and
    transmitting at least one uplink interference system information block based on the updated uplink interference system information block repetition period.

21. The method of claim 20 further comprising confirming that the process of claim 19 is still enabled and repeating the process of claim 19 after waiting an update time.

22. The method of claim 20 further comprising decoding the at least one uplink interference system information block to obtain an uplink interference level.

23. The method of claim 22 wherein the uplink interference level is used in an open loop power control calculation to determine an appropriate transmit power level for the wireless communication device.

24. An apparatus comprising a processor and a memory, the memory containing program code executable by the processor for performing the following:
    measuring paging intensity, the paging intensity based at least in part on a number of paged users within a coverage area of the apparatus over a time period; and adjusting an uplink interference system information block repetition period based on the measured paging intensity to reduce call setup time.

25. The apparatus of claim 24 wherein the memory further comprising program code for transmitting at least one uplink interference system information block based on the adjusted uplink interference system information block repetition period.

26. An apparatus comprising a processor and a memory, the memory containing program code executable by the processor for performing the following:
   measuring paging intensity, the paging intensity based at least in part on a number of paged users within a coverage area of the apparatus over a time period;
   determining a paging intensity threshold based on the measured paging intensity;
   updating an uplink interference system information block repetition period based on the paging intensity threshold to reduce call setup time; and
   transmitting at least one uplink interference system information block based on the updated repetition period.

27. An apparatus for reducing call setup time comprising:
   means for measuring paging intensity, the paging intensity based at least in part on a number of paged users within a coverage area of the apparatus over a time period; and
   means for adjusting an uplink interference system information block repetition period based on the measured paging intensity to reduce call setup time.

28. The apparatus of claim 27 further comprising means for transmitting at least one uplink interference system information block based on the adjusted uplink interference system information block repetition period.

29. An apparatus for reducing call setup time comprising:
   means for measuring paging intensity, the paging intensity based at least in part on a number of paged users within a coverage area of the apparatus over a time period;
   means for determining a paging intensity threshold based on the measured paging intensity;
   means for updating an uplink interference system information block repetition period based on the paging intensity threshold to reduce call setup time; and
   means for transmitting at least one uplink interference system information block based on the updated uplink interference system information block repetition period.

30. A non-transitory computer-readable medium including program code stored thereon, which when executed by at least one computer implement a method, comprising:
   program code for measuring paging intensity, the paging intensity based at least in part on a number of paged users within a coverage area of the at least one computer over a time period; and
   program code for adjusting an uplink interference system information block repetition period based on the measured paging intensity to reduce call setup time.

31. The computer-readable medium of claim 30 further comprising program code for transmitting at least one uplink interference system information block based on the adjusted uplink interference system information block repetition period.

32. The computer-readable medium of claim 31 further comprising program code for receiving the at least one uplink interference system information block.

33. The computer-readable medium of claim 32 further comprising program code for decoding the at least one uplink interference system information block to obtain an uplink interference level.

34. The computer-readable medium of claim 33 wherein the program code for decoding includes program code for storing the content of the at least one uplink interference system information block, program code for starting an expiration timer based at least in part on the measured paging intensity and program code for considering the content of the at least one uplink interference system information block valid until the expiration timer expires.

35. A non-transitory computer-readable medium including program code stored thereon, comprising:
   program code for causing a computer to measure paging intensity, the paging intensity based at least in part on a number of paged users within a coverage area of the computer over a time period;
   program code for causing the computer to determine a paging intensity threshold based on the measured paging intensity;
   program code for causing the computer to update an uplink interference system information block repetition period based on the paging intensity threshold to reduce call setup time; and
   program code for causing the computer to transmit at least one uplink interference system information block based on the updated uplink interference system information block repetition period.

* * * * *